US009003015B2

(12) United States Patent  
Seifert et al.

(10) Patent No.: US 9,003,015 B2
(45) Date of Patent: Apr. 7, 2015

(54) METHOD AND A SYSTEM FOR MANAGING A WEBSITE USING PROFILE KEY PATTERNS

(75) Inventors: Michael Seifert, Charlottenlund (DK); Dmytro Kostenko, København V (DK)

(73) Assignee: Sitecore A/S, København V (DK)

( * ) Notice: Subject to any disclaimer, the term of this patent is extended or adjusted under 35 U.S.C. 154(b) by 508 days.

(21) Appl. No.: 12/974,602

(22) Filed: Dec. 21, 2010

(65) Prior Publication Data

US 2012/0158950 A1    Jun. 21, 2012

(51) Int. Cl.
G06F 15/173 (2006.01)
G06F 17/30 (2006.01)

(52) U.S. Cl.
CPC ................ G06F 17/30861 (2013.01)

(58) Field of Classification Search
CPC .............. G06F 17/30861; G06F 17/30867; G06F 17/3089; G06F 17/30899; G06Q 30/02; H04L 67/22; H04L 67/306
USPC ............. 709/221, 222, 224, 223; 705/14.53; 715/738
See application file for complete search history.

(56) References Cited

U.S. PATENT DOCUMENTS

| | | | |
|---|---|---|---|
| 6,466,970 B1 * | 10/2002 | Lee et al. ..................... 709/217 |
| 6,714,975 B1 | 3/2004 | Aggarwal et al. |
| 6,981,040 B1 | 12/2005 | Konig et al. |
| 7,389,917 B2 | 6/2008 | Abraham et al. |
| 7,613,692 B2 * | 11/2009 | Hamilton et al. ..................... 1/1 |
| 2002/0087679 A1 * | 7/2002 | Pulley et al. ................. 709/224 |
| 2003/0167195 A1 | 9/2003 | Fernandes et al. |
| 2004/0122943 A1 * | 6/2004 | Error et al. ..................... 709/224 |
| 2008/0201242 A1 * | 8/2008 | Minnis et al. ................. 705/27 |
| 2009/0248494 A1 | 10/2009 | Hueter et al. |
| 2010/0030713 A1 * | 2/2010 | Simpson et al. ................ 706/11 |
| 2010/0057535 A1 | 3/2010 | Sheperd |
| 2010/0146110 A1 * | 6/2010 | Christensen et al. ......... 709/224 |
| 2010/0250477 A1 * | 9/2010 | Yadav .............................. 706/14 |
| 2011/0093461 A1 * | 4/2011 | Mui et al. ..................... 707/736 |
| 2011/0119108 A1 * | 5/2011 | Black et al. .................. 705/7.29 |

FOREIGN PATENT DOCUMENTS

WO    WO 99/60503 A1    11/1999

* cited by examiner

*Primary Examiner* — Liangche A Wang
*Assistant Examiner* — Abdulkader M Alriyashi
(74) *Attorney, Agent, or Firm* — Birch, Stewart, Kolasch & Birch, LLP

(57) ABSTRACT

A set of n profile key parameters is selected, the set of n profile key parameters defining an n-dimensional profile key. Content for a website is created while assigning profile key values to the content, each profile key value being associated to a profile key parameter. A plurality of visitors is allowed to visit the website. For each visitor, the behavior of the visitor is monitored, and a profile key for the visitor is generated in accordance with content viewed and/or actions taken by the visitor, and in accordance with the profile key values assigned to the content of the website. The generated profile key thereby reflects behavior and preferences of the visitor. One or more patterns of profile keys are identified, based on an analysis of the profile keys. The patterns of profile keys are stored in a storage device of the server.

16 Claims, 5 Drawing Sheets

METHOD AND A SYSTEM FOR MANAGING A WEBSITE USING PROFILE KEY PATTERNS

FIELD OF THE INVENTION

The present invention relates to a method and a system for managing a website, wherein patterns of profile keys are identified from profile keys generated on the basis of visitors visiting the website.

BACKGROUND OF THE INVENTION

For website owners it is often desirable to have an idea of the persons visiting the website, e.g. in order to adjust the content presented on the website to match the visitors, thereby being able to keep the attention of the visitor, and possibly make it desirable for the visitor to return to the website at a later point in time.

In the world of marketing, theoretical personal profiles, often referred to as 'personas' are sometimes used for defining personal profiles of target visitors, and for designing and authoring the website in a manner which is presumably appealing to the target visitors. However, these theoretical profiles are merely 'good guesses' regarding the personal profiles and preferences of the visitors who are actually visiting the website, and the owner of the website is not in a position to evaluate the relation between the contents presented on the website and the preferences of the visitors actually visiting the website.

U.S. Pat. No. 6,714,975 B1 discloses a method for dynamically placing objects in slots on a web page in response to current client request for the web page. The users are classified into user groups based on one or more user-characteristics, and self-learning data is accumulated based on user click behaviour for each user group. The current client request is matched with a corresponding user group, and real-time selection of the slots for the objects on the web page is scheduled based on the self-learning data of the corresponding user group.

U.S. Pat. No. 7,389,917 B2 discloses a computerized method that provides a web page having control structures for gathering behavioural biometrics. The method can compare received behavioural biometric data with at least one set of previously established values. The user can be profiled based upon comparison results. This profiling can affect the manner in which web pages are provided to the user as well as the content contained therein.

DESCRIPTION OF THE INVENTION

It is an object of embodiments of the invention to provide a method for managing a website, which allows for easy analysis of actual behavioural profiles of visitors visiting the website.

It is a further object of embodiments of the invention to provide a method for managing a website, which provides information to the website owner regarding visitor behaviour in response to content of the website.

It is an even further object of embodiments of the invention to provide a method for managing a website, which enables continuous adaptation of content presented to a visitor in accordance with preferences of the visitor.

It is an even further object of embodiments of the invention to provide a system for managing a website, the system allowing for easy analysis of actual behavioural profiles of visitors visiting the website.

It is an even further object of embodiments of the invention to provide a system for managing a website, the system being capable of generating information to the website owner regarding visitor behaviour in response to content of the website.

It is an even further object of embodiments of the invention to provide a system for managing a website, which enables continuous adaptation of content presented to a visitor in accordance with preferences of the visitor.

According to a first aspect the invention provides as method for managing a website, said website being arranged on a server, the method comprising the steps of:

selecting a set of n profile key parameters, said set of n profile key parameters defining an n-dimensional profile key, creating content for the website while assigning profile key values to the content, each profile key value being associated to a profile key parameter, allowing a plurality of visitors to visit the website, for each visitor, monitoring the behaviour of the visitor and generating a profile key for the visitor by continuously adjusting profile key parameter values in accordance with content viewed and/or actions taken by the visitor, and in accordance with the profile key values assigned to the content of the website, storing the generated profile keys for each of the plurality of visitors in a storage device of the server, analysing the stored profile keys and identifying one or more patterns of profile keys, based on said analysis, and storing the patterns of profile keys in a storage device of the server.

In the present context the term 'website' should be interpreted to mean a collection of related web pages, images, videos or other digital assets being addressed relative to a common Uniform Resource Locator (URL). The web pages of the website may advantageously be designed, presented and linked together to form a logical information resource and/or transaction initiation function. According to the first aspect of the invention, the website being managed is arranged on, or hosted on, a server. The server, and thereby the website, is typically accessible via a data network, such as the Internet or a Local Area Network (LAN). It should be noted that, in the present context, the term 'server' should be interpreted to cover a single device as well as two or more individual devices being interlinked in such a manner that they, to a visitor of the website, seem to act as a single device.

According to the method of the first aspect of the invention, a set of n profile key parameters is initially selected. The set of profile key parameters defines an n-dimensional profile key, i.e. each profile key parameter corresponds to one dimension of the n-dimensional profile key. In the present context the term 'profile key parameter' should be interpreted to mean an entity representing certain personal preferences, opinions, points of view, behaviour, etc., which are meaningful to the website owner with respect to designing the website in accordance with the visitors. The actual profile key parameters are selected by the individual website owner or manager in order to precisely reflect the information about the visitors which is relevant to that specific website owner or manager. For instance, the profile key parameters may represent personality information, political viewpoint, age, gender, geographical location, income group, etc.

The set of n profile key parameters defines an n-dimensional profile key. Thus, if a value is assigned to each of the profile key parameters, a 'vector' is defined in an n-dimensional space, the coordinates of the vector being the values assigned to the n profile key parameters. This vector represents a profile of a visitor which gave rise to the assigned values. Since the profile key parameters are selected by the website owner or manager, the visitor profile provided in this manner provides desired and useful information regarding the visitor to the website owner or manager. This will be described in further detail below.

When the n profile key parameters have been selected, content is created for the website. In the present context the term 'content' should be interpreted to include anything which a visitor may experience during a visit to the website, including content presented to the visitor, such as web pages, images, video sequences, audible sequences, etc., actions performed by the visitor, including forms being filled in, searches performed within the website, tests, navigations, polls, etc., or any other kind of content which the visitor may experience or encounter during a visit to the website.

It is further noted that the term 'creating content' should be interpreted to cover content being created for a completely new website or for completely new web pages of a web site, as well as adjustments or amendments to an existing website.

While the content for the website is created, profile key values are assigned to the content. Each profile key value is associated to a profile key parameter, i.e. each profile key value provides a value to one of the selected profile key parameters. The profile values assigned to the content are selected in such a manner that they reflect a relationship between the content and the selected profile keys. For instance, in the case that the website includes a poll requesting the visitor to state which political party he or she voted for at the latest election, various profile key values may be assigned to each possible answer, and all these profile key values may advantageously correspond to a profile key representing 'political viewpoint'. Similarly, web pages which are believed to specifically appeal to male visitors may advantageously have a profile key value assigned thereto which provides a high 'male' value for a profile key parameter representing 'gender', etc.

When the content for the website has been created, a plurality of visitors is allowed to visit the website. During each visit, the behaviour of the visitor is monitored, and a profile key for the visitor is generated. In the present context the term 'behaviour' should be interpreted to include content viewed by the visitor, sequence of web pages viewed by the visitor, actions performed by the visitor during the visit, etc. The profile key is generated by continuously adjusting profile key parameter values in accordance with content viewed and/or actions taken by the visitor. This is done in accordance with the profile key values assigned to the content of the website. Thus, as the visitor navigates the website, each time a specific piece of content is viewed, and each time an action is performed by the visitor, the values of the profile key parameters of the n-dimensional profile key for that visitor are adjusted in accordance with the profile key values which were assigned to the specific piece of content or action. Thus, if the visitor views a web page which was assigned a profile key value of 2 corresponding to profile key parameter 'gender—male', then the value of this profile key parameter of the visitor's profile key is increased by 2 points. Accordingly, the longer time the visitor spends on the website, and the more content he or she encounters, the more precisely the generated profile key for the visitor will reflect the actual personality of the visitor.

The generated profile keys for each of the plurality of visitors are stored in a storage device of the server.

The stored profile keys are then analysed. Based on the analysis, one or more patterns of profile keys are identified. For instance, the analysis may reveal that some of the stored profile keys are grouped in clusters in the n-dimensional space defined by the profile keys. In this case the identified patterns include these clusters. Alternatively, other kinds of patterns may be identified. In any event, the identified patterns reflect statistical behaviour and/or personal profiles of the visitors which have actually visited the website. Accordingly, the patterns provide valuable information to the website owner or manager regarding the personal profile and the behaviour of the visitors visiting the website, and this makes it possible for the website owner or manager to evaluate whether or not the website appears to be appealing to the target group of visitors. Furthermore, the website owner or manager may use the identified patterns for evaluating whether or not the website is designed in a manner which encourages the visitor to behave in a manner which the website owner desires, e.g. buying products or services offered for sale from the website. Furthermore, the website owner may review the information architecture of the website and correlate it with the identified patterns. If patterns change within a section of the site, or if a visitor's profile key changes rapidly between various patterns, this may be an indication that the information architecture is not well designed. If this is the case, the website owner may be prompted to improve the information architecture of the website.

Finally, the patterns of profile keys are stored in a storage device of the server. This allows the website owner or manager to use the identified patterns for evaluating and/or analysing the behaviour of subsequent visitors to the website.

It is an advantage that the patterns of profile keys are generated on the basis of actual behaviour of actual visitors of the website, rather than on the basis of artificial or theoretical personal profiles, because the patterns thereby provide valuable information about how the content of the website affects the visitors and the behaviour of the visitors to the website owner or manager. This allows the website owner or manager to adjust the content presented on the website, e.g. to more accurately target a desired group of visitors, to become generally more appealing, or to encourage a desired behaviour of the visitors. However, the present invention does not rule out that artificial or theoretical personal profiles are initially used until sufficient visitors have visited the website to create meaningful patterns.

The step of assigning profile key values to the content during creation of the content for the website may be performed by selecting one or more pre-sets of profile key values. The pre-sets of profile key values may represent 'standard' values which are often applicable for web content. According to this embodiment, the person creating the content of the website may select one or more of the pre-sets of profile key values instead of defining the values to be applied to specific kinds of content in a customized manner. It should be noted, that even if the person creating the content of the website selects one or more pre-sets of profile key values, it is still possible to adjust the profile key values, thereby customizing the profile key values to more accurately match the requirements of the website owner or manager. Using pre-sets of profile keys makes it easier and faster to assign the profile key values to the content.

The step of analysing the stored profile keys may be performed using a self-organising clustering algorithm. The self-organising clustering algorithm may, e.g., be performed using deterministic annealing. According to this embodiment, the identified patterns include clusters of profile keys in the n-dimensional space defined by the profile keys. Alternatively, other methods may be used, and other kinds of patterns may be identified.

The method may further comprise the step of interpreting the stored patterns of profile keys, thereby associating human profiles to each of the stored patterns of profile keys. According to this embodiment, once the patterns of profile keys have been identified, the website owner or manager interprets the patterns in order to determine the trends in visitor behaviour and/or personal profiles of the visitors revealed by the patterns. For instance, in the case that the analysing step is performed using a self-organising clustering algorithm, and the patterns include clusters in the n-dimensional space, as described above, each cluster represents a certain behaviour and/or personal profile. Based on the profile key values of the profiles belonging to each cluster, a human profile matching the behaviour and/or personal profile trend of the cluster can be selected and associated to the cluster.

According to one embodiment, the profile key parameters may represent psychometric attributes, and the human profiles may be based on personas. There may a one-to-one relationship between the human profiles and a number of personas. As an alternative, each human profile may be based on two or more different personas, in which case the human profiles may be regarded as representing 'archetypes'. As another alternative, two or more patterns may be related to one persona. The personas may be used during creation of the content for the website in order to visualise target groups of visitors, although each persona does not correspond exactly to one pattern. Examples of psychometric attributes include, but are not limited to impulsive, reflective, extrovert, introvert, factual, emotional, social awareness, dominant, creative, well-organized, etc. As described above, personas are artificial or theoretical personal profiles which are sometimes used by marketing personnel in order to visualize a target group. Personas are often provided with a name, a photo and a description of the job situation, age, family status, interest, political viewpoint, etc., in order to make it easier for the marketing personnel, or in this case the person managing the website, to visualize a target group, or in this case the actual visitors of the website.

The method may further comprise the steps of:
allowing an additional visitor to visit the website,
monitoring the behaviour of the visitor and generating a profile key for the visitor by continuously adjusting profile key parameter values in accordance with content viewed and/or actions taken by the visitor, and in accordance with the profile key values assigned to the content of the website,
comparing the generated profile key of the visitor to the stored patterns of profile keys, and
categorising the visitor based on the comparison step.

According to this embodiment, the monitoring of the behaviour of the visitor and the generation of the profile key for the visitor are performed as described above, i.e. in the same manner as the one applied when the patterns of profile keys were identified. When the profile key for the new visitor has been generated, it is compared to the stored patterns of profile keys and categorised in accordance with the comparison. Thereby it can be determined which of the stored patterns the new visitor resembles most, and the website owner or manager thereby obtains knowledge regarding the expected preferences and behaviour of the new visitor.

The comparing and categorising steps may be performed once when the visit has been completed. Alternatively, the comparing and categorising steps may be performed continuously and dynamically during the visit. In this case the category of the visitor may change during the visit, as the profile key parameters of the profile key are continuously adjusted.

The comparing step may comprise measuring n-dimensional distances between the visitor's generated profile key and one or more of the stored patterns of profile keys. The distance to a pattern may be calculated by measuring respective distances to all or to a representative selection of the profile keys belonging to the pattern, and calculating a representative distance based on the respective measurements. As an alternative, the distance may be calculated by calculating or generating an average or representative profile key for the pattern, and then measure the distance between the average or representative profile key and the profile key of the new visitor. The average or representative profile key may, e.g., be calculated or generated by calculating averages of each of the profile key values of the profile keys belonging to the pattern. The profile key values may be converted into average or percentage values before the distance is calculated, possibly even before the patterns are identified. In this case all n-dimensional vectors corresponding to profile keys have a length equal to one, thereby making it easier to compare the profile keys.

The method may further comprise the step of determining that there is a match between the visitor's generated profile key and a stored pattern of profile keys if the measured n-dimensional distance between the visitor's generated profile key and said pattern is smaller than a predefined threshold value. According to this embodiment, when the profile key of the visitor is sufficiently close to or sufficiently similar to a stored pattern, it is determined that the visitor 'belongs' to this pattern, i.e. is expected to have a behaviour and a personal profile which is very similar to the other visitors which gave rise to the pattern.

Alternatively or additionally, the measured n-dimensional distances may determine a likelihood or percentage weight match between the visitor's generated profile key and the stored patterns of profile keys. According to this embodiment, the comparison step may, e.g., reveal that the profile key of the new visitor does not match a single pattern, but turns out to be, e.g., 80% pattern 1, 15% pattern 2 and 5% pattern 3. In this case the method of the invention may categorise the visitor according to this.

The method may further comprise the step of personalising content presented to the visitor, based on the comparison step and/or based on the categorising step. Once the new visitor has been categorised as described above, the website owner or manager has gained knowledge of the expected preferences, personal profile and behaviour of the visitor. This knowledge may then be used for personalising the content presented to the visitor, i.e. the content may be selected in accordance with the expected preferences of the visitor, and in such a manner that it encourages the visitor to behave in a manner which is desirable to the website owner.

The method may further comprise the steps of:
investigating whether or not the visitor is identical to a previous visitor, and
in the case that the visitor is identical to a previous visitor, continuing a previous visit of the visitor to the website.

The step of investigating whether or not the visitor is identical to a previous visitor may, e.g., be performed by means of cookies, by analysing the IP address of the device from which the visitor is accessing the website, by means of login information, etc.

If the visitor has previously visited the website, then the last stored profile key for that visitor may be loaded, such that the visitor's behaviour on the website will affect the profile key parameter values of the visitor's profile key from the point where the visitor last left the website, rather than generating a new profile key from scratch.

In the case that the visitor has visited the website previously, he or she may want to skip intros or web pages which are irrelevant or not appealing to the visitor. In the case that it is determined that the visitor is identical to a previous visitor, i.e. that the visitor has visited the website previously, the visitor may be directed directly to web pages which are most likely relevant and appealing to the visitor.

The method may further comprise the steps of:
- allowing one or more additional visitors to visit the website,
- for each additional visitor, monitoring the behaviour of the visitor and generating a profile key for the visitor by continuously adjusting profile key parameter values in accordance with content viewed and/or actions taken by the visitor, and in accordance with the profile key values assigned to the content of the website,
- storing the generated profile keys for each of the additional visitors in a storage device of the server, and
- repeating the steps of analysing the stored profile keys and storing the patterns of profile keys, thereby obtaining updated patterns of profile keys, including information obtained from the additional visitor(s).

According to this embodiment, the patterns of profile keys are dynamical in the sense that they are continuously updated and adjusted as additional visitors visit the website. Thereby it is obtained that the statistical material used for generating the patterns is as extensive as possible. Furthermore, it is obtained that the patterns match the recent group of visitors, rather than matching an outdated group of visitors. For instance, the content of the website may be modified, and this may have the consequence that the types of visitors visiting the website and/or the behaviour of the visitors changes. In this case it is an advantage that the stored patterns of profile keys correspond to the latest version of the website.

The method may further comprise the step of displaying a graphical representation of the patterns of profile keys. Graphical representations are often well suited for providing an easily understandable and clear overview of vast amounts of data. A graphical representation therefore provides a good tool for the website owner or manager to understand the visitors visiting the website, and to identify content which is in need of adjustments in order to obtain desired behaviour from the visitors. The graphical representation may, e.g., be in the form of a radar chart, an n-dimensional graph, a bar chart, etc.

According to a second aspect the invention provides a system for managing a website arranged on a server, the system comprising:
- a user interface allowing an operator to define an n-dimensional profile key by selecting a set of n profile key parameters, and allowing an operator to create content for the website while assigning profile key values to the content, each profile key value being associated to a profile key parameter,
- visitor analysing tool adapted to monitor the behaviour of visitors visiting the website, to generate profile keys for the visitors by continuously adjusting profile key parameter values in accordance with content viewed and/or actions taken by the visitor, and in accordance with the profile key values assigned to the content of the website, and to analyse the generated profile keys, thereby identifying one or more patterns of profile keys, and
- a storage device for storing the generated profile keys for each visitor and for storing the patterns of profile keys.

It should be noted that a person skilled in the art would readily recognise that any feature described in combination with the first aspect of the invention could also be combined with the second aspect of the invention, and vice versa.

The system according to the second aspect of the invention is preferably adapted to perform the method according to the first aspect of the invention. The remarks set forth above with reference to the first aspect of the invention are therefore equally applicable here.

The system may be residing on a server having the website arranged thereon. As an alternative, the system, or part of the system, may be residing on a different computer device arranged adjacent to or remotely from the server.

The user interface may further be adapted to display a graphical representation of patterns of profile keys to the user, e.g. in the form of a radar chart, an n-dimensional graph, a bar chart, etc., as described above. In this case the user interface may advantageously comprise a display screen.

BRIEF DESCRIPTION OF THE DRAWINGS

The invention will now be described in further detail with reference to the accompanying drawings in which.

DETAILED DESCRIPTION OF THE DRAWINGS

Figure 1:
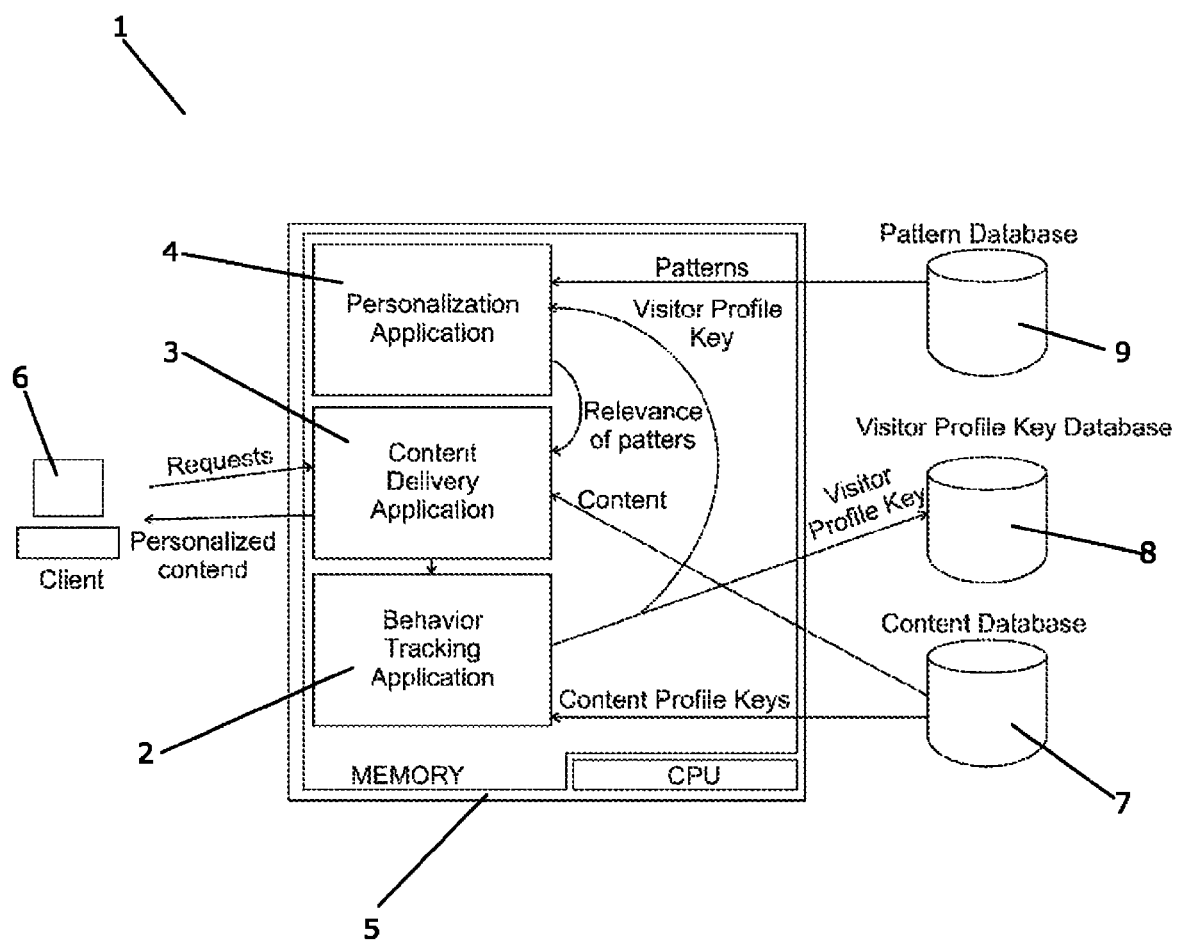
FIG. 1 is a schematic view illustrating a system according to an embodiment of the invention.

FIG. 1 is a schematic view illustrating a system 1 according to an embodiment of the invention. The system 1 is suited for being used for managing a website. The system 1 comprises a behaviour tracking application 2, a content delivery application 3 and a personalisation application 4, all residing on a server 5.

A visitor accesses the content of the website from a client device 6, and the content delivery application 3 delivers content to the client device 6 upon requests from the visitor, thereby allowing the visitor to view desired content and/or perform desired actions within the website. In FIG. 1, the client device 6 is illustrated as a personal computer (PC), but it should be noted that the client device 6 could alternatively be a cell phone, a tablet, or any other suitable kind of client device allowing the visitor to access the website.

While the visitor navigates the website, the behaviour tracking application 2 monitors the navigations and/or actions performed by the visitor. During this, a profile key for the visitor is generated by the behaviour tracking application 2. This is done by continuously adjusting profile key parameter values in accordance with profile key values which has previously been assigned to content viewed by the visitor and/or actions performed by the visitor. The profile key values are provided to the behaviour tracking application 2 by a content database 7.

The generated profile key for the visitor is forwarded to a visitor profile key database 8, where it is stored. The generated profile key for the visitor is also forwarded to the personalisation application 4. The personalisation application 4 compares the visitor profile key to patterns of profile keys received from a pattern database 9. The patterns of profile keys have previously been generated in a manner which will be described below with reference to FIG. 2.

The comparison between the generated profile key for the visitor and the patterns of profile keys provides information about the personal profile of the visitor. The personalisation application 4 forwards this information to the content delivery application 3, thereby enabling the content delivery application 3 to deliver content to the client device 6, the content being personalised in accordance with the generated profile key for the visitor.

Figure 2:
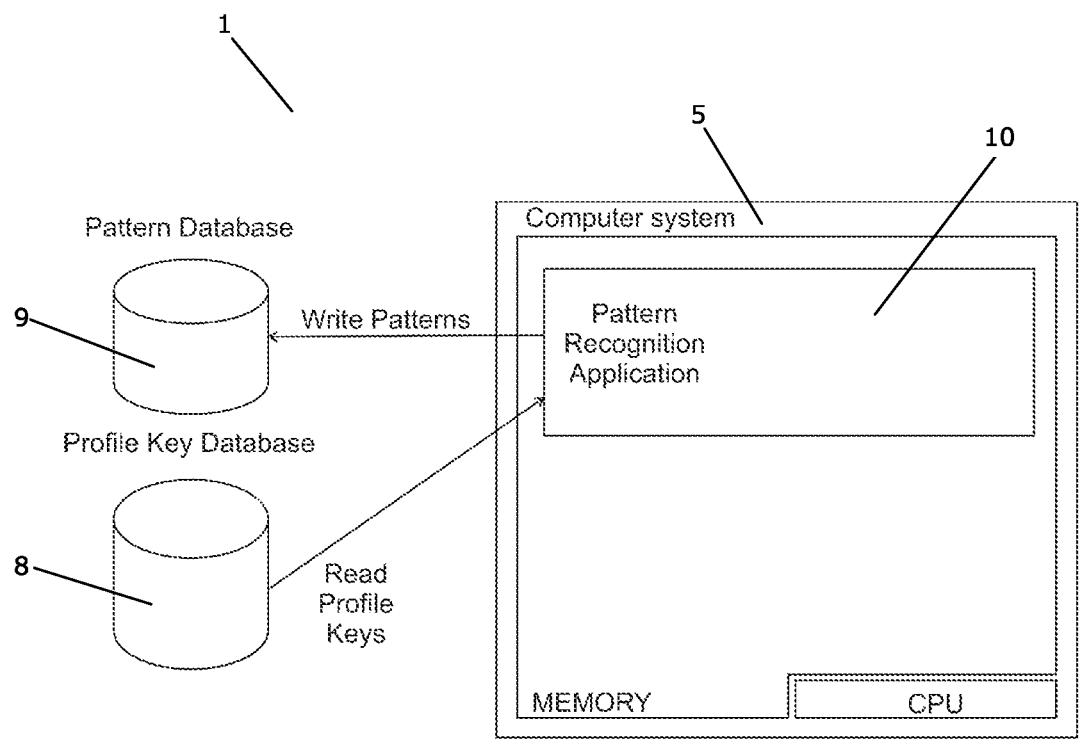
FIG. 2 is a schematic view illustrating a system according to another embodiment of the invention.

FIG. 2 is a schematic view illustrating a system 1 according to another embodiment of the invention. The system 1 of FIG. 2 could advantageously form a part of or cooperate with the system 1 illustrated in FIG. 1.

In the system 1 of FIG. 2, a pattern recognition application 10 resides on a server 5. The pattern recognition application 10 receives profile keys from a profile key database 8. The profile keys have been generated previously and stored in the profile key database 8. This may, e.g., be done in the manner described above with reference to FIG. 1.

The pattern recognition application 10 analyses the received profile keys. Based on the analysis, the pattern recognition application 10 identifies one or more patterns of profile keys. The analysis step may, e.g., include using deterministic annealing or another suitable kind of self-organising clustering algorithm. In this case, the pattern recognition application 10 investigates whether or not the received profile keys are grouped or clustered in an n-dimensional space defined by the profile key parameters of the profile keys.

The identified patterns of profile keys are forwarded to a pattern database 9 and stored there. Subsequently, the stored patterns of profile keys may be used for comparison with generated profile keys for visitors visiting the website, as described above with reference to FIG. 1.

Figure 3:
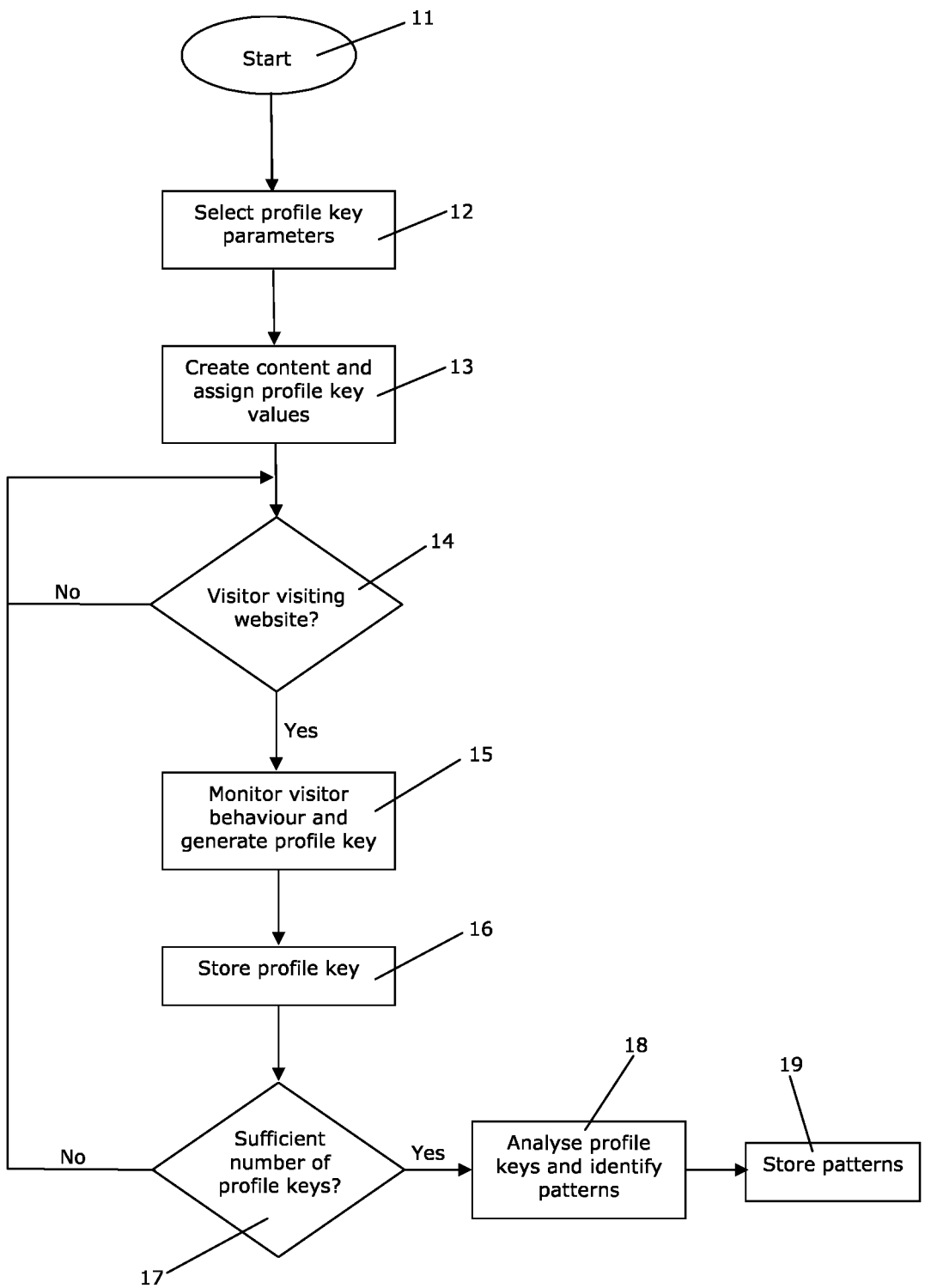
FIG. 3 is a flow diagram illustrating a method according to an embodiment of the invention.

FIG. 3 is a flow chart illustrating a method according to an embodiment of the invention. The process is started at step 11. At step 12 a number of profile key parameters are selected. The profile key parameters define an n-dimensional profile key, and each profile key parameter represents personal and/or behavioural attributes, such as certain personal preferences, opinions, points of view, e.g. politically, behaviour, age, gender, geographical location, income group, etc. Thus, when profile key values have been assigned to each of the profile key parameters, an n-dimensional profile key representing a personal profile with respect to the selected profile key parameters is generated. Step 11 is performed by the website owner or manager, and the profile key parameters are selected in a manner which results in profile keys which provide desired information to the website owner or manager.

When the profile key parameters have been selected, the website owner or manager creates content to be displayed at the website, at step 13. While creating the content, the website owner or manager assigns profile key values to the content. Each assigned profile key value is associated to a profile key parameter in the sense that when a visitor views a specific piece of content or performs a specific action, the associated profile key parameter is adjusted with an amount corresponding to the profile key value assigned to that specific content. The profile key values are selected in such a manner that they provide a realistic correspondence between the behaviour of a visitor and the personal attributes defined by the profile key parameters.

When the content has been created, the website, and thereby the created content, can be accessed by visitors. Accordingly, at step 14 it is investigated whether or not a visitor is visiting the website. If this is not the case, the process is returned to step 14, i.e. the website is monitored until a visitor is detected.

If step 14 reveals that a visitor is visiting the website, the behaviour of the visitor is monitored at step 15. This results in a profile key for that visitor being generated. The profile key is generated in such a manner that the profile key parameters are adjusted in accordance with the profile key values assigned to the content which the visitor views and to actions which the visitor performs during the visit. Accordingly, the generated profile key reflects personal preferences, points of view, etc. of the visitor which visited the website.

The generated profile key is stored at step 16 when the visit has been completed. When the profile key has been stored, it is investigated, at step 17, whether or not a sufficient number of profile keys have been generated and stored. If this is not the case, the process is returned to step 14 in order to generate and store an additional profile key for a new visitor.

In the case that step 17 reveals that a sufficient number of profile keys have been generated and stored, the stored profile keys are analysed at step 18. During this analysis, it is investigated how the profile keys are grouped or clustered in an n-dimensional space defined by the profile key parameters, i.e. patterns of profile keys are identified in the n-dimensional space.

The analysis may further comprise the step of interpreting the identified patterns and establishing a correspondence between each identified pattern and a personal profile or type of profile. Thereby the identified patterns provide information to the website owner or manager regarding typical personal profiles of visitors who have visited the website.

Finally, the identified patterns of profile keys are stored in a storage device at step 19 for later use. It is an advantage that the patterns are generated on the basis of actual visits to the website instead on the basis of theoretical personal profiles and/or on the basis of assumptions regarding the target group of visitors, since the patterns thereby to a much greater extent reflects the actual situation. This can be very valuable information to a website owner or manager.

Figure 4:
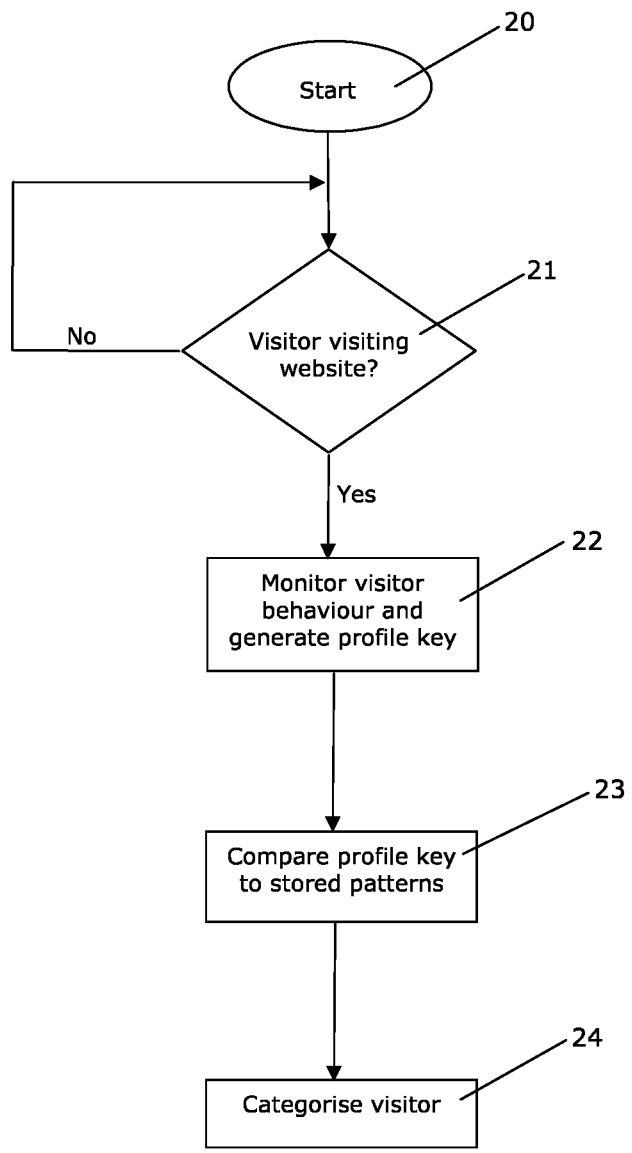
FIG. 4 is a flow diagram illustrating a method according to another embodiment of the invention.

FIG. 4 is a flow diagram illustrating a method according to another embodiment of the invention. The method illustrated in the flow diagram of FIG. 4 may, e.g., be performed in addition to and/or in cooperation with the method illustrated in the flow diagram of FIG. 3.

In the flow diagram of FIG. 4, the process is started at step 20. At step 21 it is investigated whether or not a visitor is visiting the website. If this is not the case, the process is returned to step 21, i.e. the website is monitored until a visitor is detected.

If step 21 reveals that a visitor is visiting the website, the behaviour of the visitor is monitored at step 22. This results in a profile key for that visitor being generated. The profile key is generated in such a manner that the profile key parameters are adjusted in accordance with profile key values which have previously been assigned, e.g. in the manner described above with reference to FIG. 3, to the content which the visitor views and to actions which the visitor performs during the visit. Accordingly, the generated profile key reflects personal preferences, points of view, etc. of the visitor which visited the website.

At step 23, the generated profile key is compared to stored patterns of profile keys. The stored patterns of profile keys may advantageously be generated in the manner described above with reference to FIG. 3.

Finally, at step 24, the visitor is categorised as a result of the comparing step. For instance, the comparing step may reveal that the current visitor may be regarded as 'belonging to' one of the previously identified patterns of profile keys, i.e. the profile key of the current visitor may substantially match a representative profile key for that pattern. In this case it is very likely that the visitor behaves very similarly to the visitors which gave rise to the pattern, and the visitor is categorised as belonging to this pattern.

As an alternative, the comparing step may reveal that the personal profile of the current visitor appears to correspond to, e.g., 70% a first pattern and 30% a second pattern. In this case the visitor is categorised as 70% the first pattern and 30% the second pattern.

As another alternative, the comparing step may reveal that the profile key of the current visitor does not correspond to any of the patterns of profile keys. In this case the visitor is categorised as not belonging to any of the patterns of profile keys.

Figure 5:
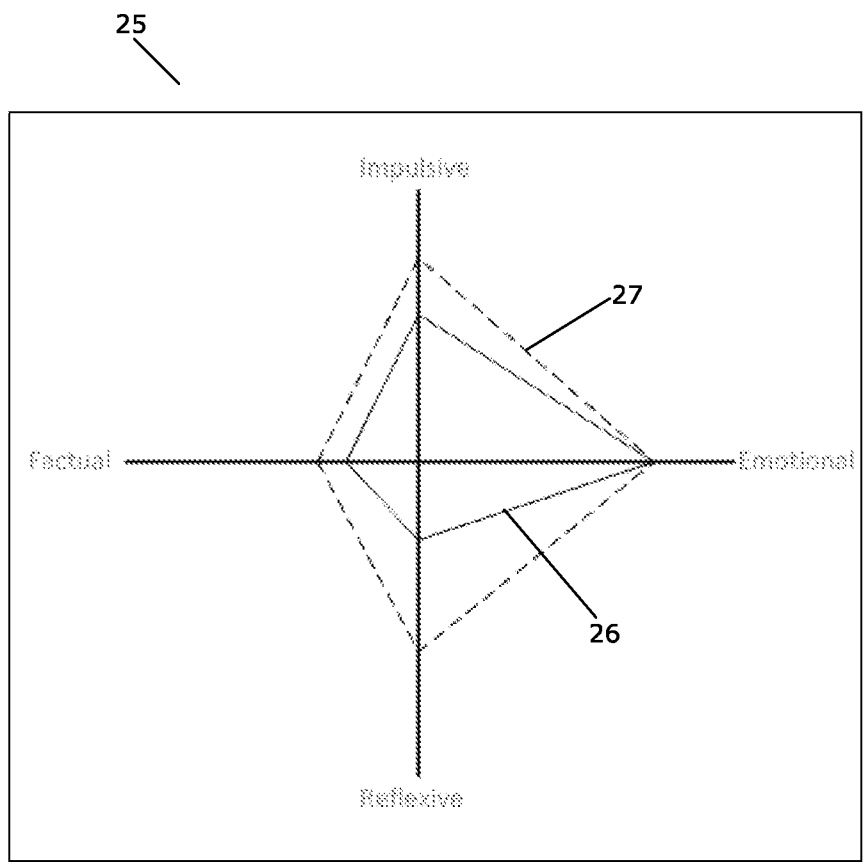
FIG. 5 is a radar chart illustrating a profile key for a visitor to a website and a pattern.

FIG. 5 is a radar chart 25 illustrating a pattern 26 and a profile key 27 for a visitor to a website. Four profile key parameters are used, i.e. 'factual', 'impulsive', 'emotional' and 'reflective'. Each of the profile key parameters of the pattern 26 and the profile key 27 is plotted along one of the four axes shown in FIG. 5.

As described above, when a visitor visits a website, the content viewed by the visitor and the actions performed by the visitor results in adjustments of the profile key values of the four profile key parameters mentioned above. During the visit, a four-dimensional profile key for the visitor is thereby been generated, the profile key indicating values for each of the profile key parameters. The profile key is then plotted in the radar chart 25 in such a manner that the value of each profile key parameter is plotted along the relevant axis, and the plotted points at the axes are connected by straight lines.

In FIG. 5 a pattern 26 and a profile key 27 for a visitor are shown. The pattern 26 has a high 'emotional' value, relatively low 'factual' and 'reflective' values, and a medium 'impulsive' value. Thus, visitors matching the pattern 26 must be expected to react and behave emotionally and, to some extent, impulsively. However, such a visitor will most likely not respond to factual information. In order to be appealing to a visitor matching the pattern 26, the website should only contain small amounts of factual information, and it should be easy for the visitor to perform actions which are valuable for the website owner, such as purchasing a product or ordering a catalogue, thereby increasing the probability of the visitor performing such an action. Furthermore, the information on the website should be presented in an appealing manner which makes the visitor want to perform the value generating actions. For instance, products offered for sale may be presented in a manner which immediately makes the visitor want to buy the product, additional products could be offered if the visitor adds a product to a shopping basket, etc.

By means of the radar chart 25, the profile key 27 of the visitor can be compared to the pattern 26. It can be seen that the visitor giving rise to the profile key 27 has an 'emotional' value which is identical to the 'emotional' value of the pattern 26. However, the 'factual', 'reflective' and 'impulsive' values are all somewhat higher, the 'factual' value being the lowest of the four values. Thus, the profile key 27 does not exactly match the pattern 26. However, the four-dimensional distance between the pattern 26 and the profile key 27 is sufficiently small to justify that the profile key 27 is categorised as belonging to the pattern 26. Thereby the website owner or manager may apply knowledge regarding the expected behaviour of a visitor matching the pattern 26 for predicting behaviour of the visitor giving rise to the profile key 27.

The invention claimed is:

1. A method for managing a web site, said web site being arranged on a server, the method comprising the steps of:
    selecting a set of n profile key parameters, said set of n profile key parameters defining an n-dimensional profile key, each profile key parameter corresponding to one dimension of the n-dimensional profile key, and the n-dimensional profile key forming a vector in an n-dimensional space,
    creating content for the website while assigning profile key values to the content, each profile key value being associated to a profile key parameter,
    allowing a plurality of visitors to visit the website,
    for each visitor, monitoring the behavior of the visitor and generating a profile key for the visitor by continuously adjusting profile key parameter values in accordance with content viewed and/or actions taken by the visitor, and in accordance with the profile key values assigned to the content of the website,
    storing the generated profile keys for each of the plurality of visitors in a storage device of the server,
    analyzing the stored profile keys and identifying one or more patterns of profile keys, based on said analysis, said one or more patterns of profile keys forming grouped clusters in the n-dimensional space defined by the profile keys,
    storing the patterns of profile keys in a storage device of the server,
    allowing an additional visitor to visit the website,
    monitoring the behavior of the additional visitor and generating a profile key for the additional visitor by continuously adjusting profile key parameter values in accordance with content viewed and/or actions taken by the additional visitor, and in accordance with the profile key values assigned to the content of the website,
    comparing the generated profile key of the additional visitor to the stored patterns of profile keys, by measuring n-dimensional distances between the generated profile key of the additional visitor and one or more of the stored patterns of profile keys, and
    categorizing the additional visitor based on the comparison step.

2. The method according to claim 1, wherein the step of assigning profile key values to the content during creation of the content for the website is performed by selecting one or more pre-sets of profile key values.

3. The method according to claim 1, wherein the step of analyzing the stored profile keys is performed using a self-organizing clustering algorithm.

4. The method according to claim 3, wherein the self-organizing clustering algorithm is performed using deterministic annealing.

5. The method according to claim 1, further comprising a step of interpreting the stored patterns of profile keys, thereby associating human profiles to each of the stored patterns of profile keys.

6. The method according to claim 5, wherein the profile key parameters represent psychometric attributes, and wherein the human profiles are based on personas.

7. The method according to claim 1, wherein the comparing step comprises measuring n-dimensional distances between the visitor's generated profile key and one or more of the stored patterns of profile keys.

8. The method according to claim 7, further comprising the step of determining that there is a match between the visitor's generated profile key and a stored pattern of profile keys if the measured n-dimensional distance between the visitor's generated profile key and said stored pattern is smaller than a predefined threshold value.

9. The method according to claim 7, wherein the measured n-dimensional distances determines a likelihood or percentage weight match between the visitor's generated profile key and the stored patterns of profile keys.

10. The method according to claim 1, further comprising the step of personalizing content presented to the visitor, based on the comparison step and/or based on the categorizing step.

11. The method according to claim 1, further comprising the steps of:
- investigating whether or not the visitor is identical to a previous visitor, and
- in the case that the visitor is identical to a previous visitor, continuing a previous visit of the visitor to the website.

12. The method according to claim 1, further comprising the steps of:
- allowing one or more new visitors to visit the website,
- for each new visitor, monitoring the behavior of a new visitor and generating a profile key for the new visitor by continuously adjusting profile key parameter values in accordance with content viewed and/or actions taken by the new visitor, and in accordance with the profile key values assigned to the content of the website,
- storing the generated profile keys for each of the new visitors in a storage device of the server, and
- repeating the steps of analyzing the stored profile keys and storing the patterns of profile keys, thereby obtaining updated patterns of profile keys, including information obtained from the new visitor(s).

13. The method according to claim 1, further comprising the step of displaying a graphical representation of the patterns of profile keys.

14. A system for managing a website arranged on a server, the system comprising:
- a user interface allowing an operator to define an n-dimensional profile key by selecting a set of n profile key parameters, each profile key parameter corresponding to one dimension of the n-dimensional profile key, and the n-dimensional profile key forming a vector in an n-dimensional space, and allowing an operator to create content for the website while assigning profile key values to the content, each profile key value being associated to a profile key parameter,
- visitor analyzing tool adapted to monitor the behavior of visitors visiting the website, to generate profile keys for the visitors by continuously adjusting profile key parameter values in accordance with content viewed and/or actions taken by the visitors, and in accordance with the profile key values assigned to the content of the website, and to analyze the generated profile keys, thereby identifying one or more patterns of profile keys, said one or more patterns of profile keys forming grouped clusters in the n-dimensional space defined by the profile keys,
- a storage device for storing the generated profile keys for each visitor and for storing the patterns of profile keys, and
- a comparing module adapted to compare a generated profile key of an additional visitor to the website to stored patterns of profile key, by measuring n-dimensional distances between the generated profile key of the additional visitor and one or more of the stored patterns of profile keys, and to categorize the additional visitor based on the comparison.

15. The system according to claim 14, said system residing on a server having the website arranged thereon.

16. The system according to claim 14, wherein the user interface is further adapted to display a graphical representation of patterns of profile keys to the operator.

* * * * *